INVENTOR
PAUL F. WOERNER
BY ATTORNEYS

United States Patent Office 3,529,988
Patented Sept. 22, 1970

3,529,988
**METHOD FOR MAKING HYPERSTOICHIO-
METRIC CARBIDE COMPOSITIONS**
Paul F. Woerner, Grosse Pointe, Mich., assignor to
Teeg Research, Inc., Detroit, Mich., a corporation of
Delaware
Filed Sept. 23, 1966, Ser. No. 581,646
Int. Cl. C23c 11/08
U.S. Cl. 117—46                                28 Claims

ABSTRACT OF THE DISCLOSURE

A method for making a metal carbide-carbon composition in the form of a coating on a substantially stable substrate, the composition being obtained as the result of the heat reaction of a hydrocarbon, hydrogen and a halide of the metal. The resulting metal carbide-carbon composition falls within the hyperstoichiometric region of the carbide-carbon phase diagram, preferably in the hypoeutectic and hypereutectic regions of the phase diagram, and the free carbon content of the composition is substantially proportional to the temperature of reaction and to the hydrocarbon halide mol ratio and inversely proportional to the hydrogen to halide ratio of the reactants.

---

The present invention relates to a method for making hypo- and hypereutectic carbide material composed of a carbide-carbon dispersion, and to the material made according to the method of the invention.

It is well known that metal carbides, such as carbides of tungsten, titanium, cobalt, hafnium, tantalum, columbium, zirconium and the like have the highest melting points of known materials and are endowed with extreme hardness. However, carbides are brittle and generally have inadequate resistance to mechanical shock. In addition carbides show poor performances at high temperatures because of their sensitivity to thermal shock and because of their poor oxidation resistance. For this reason, carbides, particularly in the aerospace industry, have had only limited applications at high temperatures, and have not successfully compete with other materials such as graphite or tungsten, or the like, for nose tips for re-entry vehicles or for rocket engines.

It has recently been found, however, that when carbides are used in conjunction or in dispersion with a lower modulous material, such as graphite, a major improvement in mechanical and thermal shock resistance results. Carbides-graphite dispersion have heretofore been obtained in one or two ways, either by mixing powdered graphite with powdered carbide and hot pressing the mixture, or by arc fusion of the individual elements and casting to shape. It is evident that in order to obtain a homogeneous dispersion of metal carbide and graphite by either of the known methods, it is necessary in the powdered metallurgy method to effectuate a homogeneous mixture before hot pressing, and that the variety of configurations obtainable by such a method is somewhat limited. Dispersions obtained by the second method, arc fusion, often do not reach the proper desirable admixture in view of the differences in vaporization rates between the carbon and the carbide or carbides. Generally, arc fusion must be effected under slightly pressurized atmosphere, and even under such condition, the material tends to become depleted in carbon.

The method of the present invention present a substantial improvement upon heretofore available methods by permitting to obtain a carbide or carbide-carbon dispersion by chemical vapor deposition, and provides for tight control of the composition of the material thus obtained by adjusting the reactants quantitative ratios and the temperature of reaction. In this manner, are obtained according to the invention materials formed of a homogeneous dispersion of carbide or carbides and carbon, the proportion of carbon to carbide in the dispersion falling generally within the hyperstoichiometric region of the phase diagram of the particular carbide or carbides in the material, and preferably in the hypoeutectic and hypereutectic regions of the phase diagram. By the method of the invention, metal carbide-carbon materials are obtained which have a much lower density than the density of the appropriate carbide of stoichiometric composition, which have a substantially high melting temperature, which have a low reactivity with most chemicals, including acid, which are provided with a substantially high elasticity modulus and strength to weight ratio, and which have much improved thermal and mechanical shock resistance as compared to pure carbide. The resulting materials are a dense, substantially pure and homogeneous metal carbide-carbon dispersion having no binder, which can be obtained in any desired shape and thickness, and which may be deposited on any appropriate substrate.

The principal object of the invention therefore is to teach a novel method for making hypo- and hypereutectic carbide composites including a carbide-carbon dispersion, wherein the proportion of carbon to carbide are controlled by operating at a predetermined ratio of their reactants and at a predetermined reaction temperature.

A further object of the invention is to teach a method for making a metal carbide-carbon dispersion having a predetermined carbon to carbide ratio by way of thermal decomposition and reduction of appropriate gaseous reactants.

Another object of the method of the invention consists in obtaining a material composed of a metal carbide-carbon dispersion having a predetermined carbon to carbide ratio by vapor deposition of volatile compounds upon a substrate.

Other objects and advantages of the present invention will become apparent when the following description of some of the best modes of practicing the invention is considered in conjunction with the accompanying graphs wherein.

Figure 1:
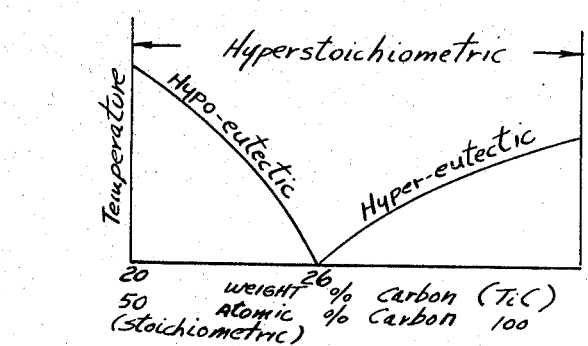
FIG. 1 represents the hyperstoichiometric portion of the phase diagram of a typical carbon-carbide material.

The method of the invention is practiced by placing in a work chamber a heated substrate, and by depositing unto the substrate a homogeneous dispersion of metal carbide and carbon, having a predetermined carbon to carbide ratio. The substrate may consist of an inert material such as quartz, or it may consists of a material, such as graphite for example, capable of reacting with the constituents of the material being deposited thereon. The metal carbide-carbon dispersion deposited upon the substrate disposed in the work chamber is obtained by reacting a metal halide with a hydrocarbon in a hydrogen atmosphere, and by metering the reactants into the work chamber. The operation is effected at a temperature generally above 1200° C. the hydrogen gas acting also as a carrier gas. Thermal decomposition and reduction of the reactants occur in the work chamber and the desired atoms are deposited on a substrate at a predetermined composition by careful control of the temperature of reaction, of the hydrogen to halide ratio and of the hydrogen to hydrocarbon ratio.

The basic general reaction involved in the formation of the carbide component in the dispersion can be expressed as:

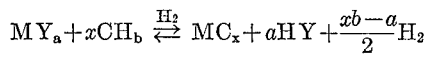

wherein M is a metal, Y is a halogen, C is carbon, H is hydrogen, $H_2$ is hydrogen gas, and $a$ and $b$ are integers for conditions where $x$ is greater than 1. Consequently, $MY_a$ is generally a volatile compound, preferably a halide of the metal M, and $CH_b$ is a volatile hydrocarbon. $MC_x$ is the deposited carbide and HY is the halide reaction product.

By the method of the invention, any specific metal carbide-carbon or metal carbides-carbon homogeneous dispersions may be obtained, such as dispersions of carbon with titanium carbide, tungsten carbide, zirconium carbide, hafnium carbide, tantalum carbide, columbium carbide, or the like, as dispersions of carbon with either one or several carbides.

As an example of specific reaction, titanium carbide can be obtained by reacting titanium tetrachloride and methane in a hydrogen atmosphere, according to the following formula:

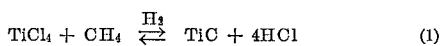     (1)

The above reaction is actually the result of the following reactions:

$$TiCl_4 + 2H_2 \rightleftarrows Ti + 4HCl \quad (2)$$

$$CH_4 \rightleftarrows C + 2H_2 \quad (3)$$

Combining reactions (2) and (3) results in the overall basic reaction (1). Reaction (2) is the hydrogen reduction of titanium tetrachloride, and reaction (3) is the thermal dissociation of methane. Thus, hydrogen acts as a reductant, even though it does not appear in the final reaction. The role of hydrogen is consequently both of a reductant for $TiCl_4$ and of a carrier in the reaction.

A specific reaction for making $TiC_{1.5}$ can be expressed as:

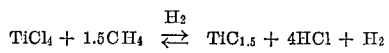

Figure 2:
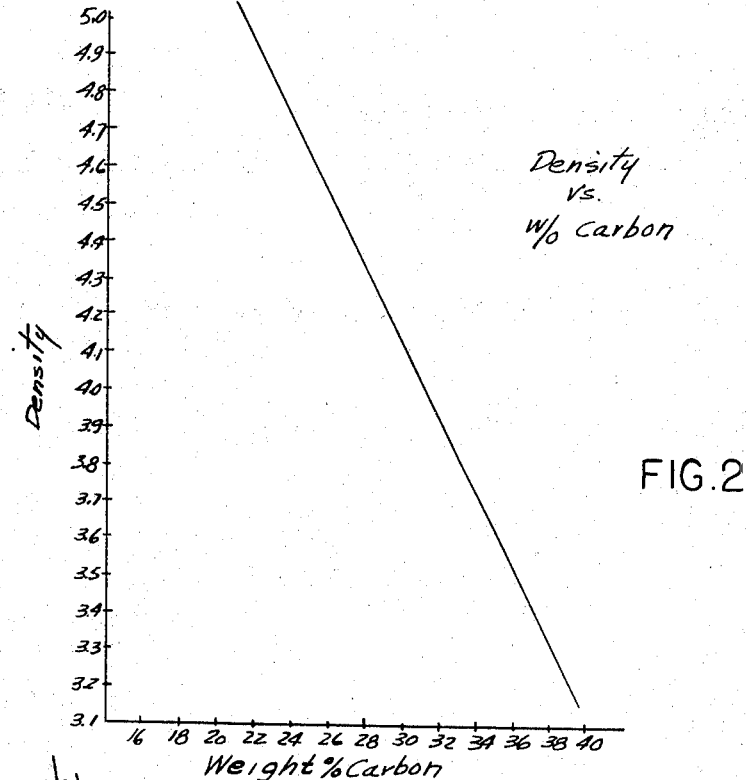
FIG. 2 is a representation of a graph showing the variation of density of a typical carbon-carbide material in function of the weight percent of carbon in the material.

It has been discovered that the weight percent of carbon in the carbide-carbon dispersion may be closely controlled according to the reaction temperature, the hydrogen to hydrocarbon ratio and the hydrogen to carbide ratio. In this manner any material comprising carbon and a metal can be obtained having either the stoichiometric composition, or a hypoeutectic or hypereutectic composition, as represented in FIG. 1 showing the hyperstoichiometric portion of the phase diagram of a carbon-carbide material and indicating the melting temperatures of, for example, titanium carbide-carbon materials in function of the carbon concentration therein. The materials having particular importance in view of their increased mechanical and thermal shock resistance fall within this hyperstoichiometric portion of the phase diagram and more particularly within the hypoeutectic and hypereutectic portions thereof. As shown in FIG. 2, the density of such a homogeneous dispersion of carbon and carbide has a density which decreases from about 5 at a composition close to the stoichiometric composition (20% by weight of carbon or 50% atomic carbon) to a density close to 3.1 for a material comprising about 40% by weight of carbon.

Therefore, besides the usual characteristics associated with carbides, such as high melting point, extreme hardness, low rate of vaporization, resistance to oxidization, materials prepared according to the method of the present invention, in addition to showing very good mechanical and thermal shock resistance, can be obtained in various densities so as to present noted advantages in application where the weight of a structure is an important factor.

Figure 3:
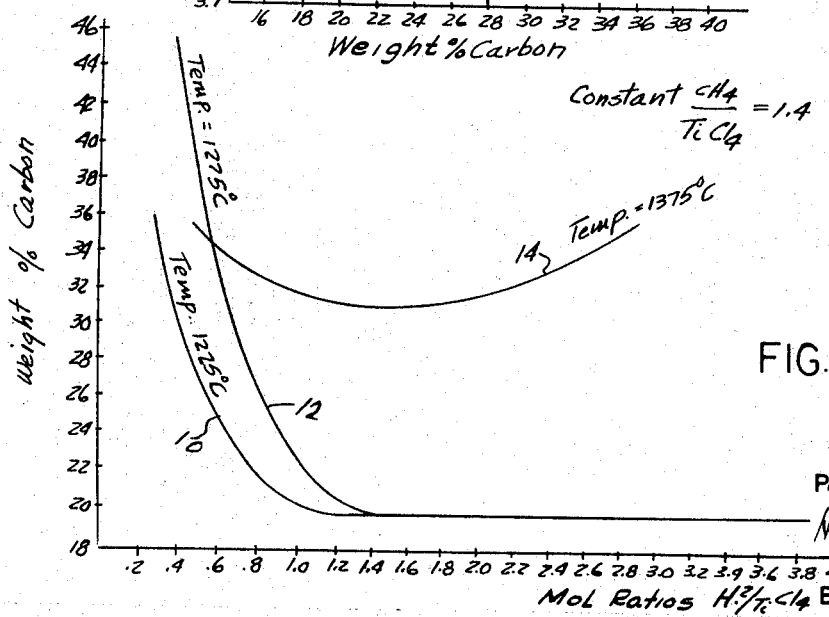
FIG. 3 is a diagram showing the effect of the variation of the ratio of two of the reactants upon the weight percent of carbon content in the resulting material.

FIG. 3 demonstrates the effect of varying the hydrogen to halide ratio of the reactants, at diverse constant reaction temperatures and at a fixed hydrocarbon to halide mol ratio of 1.4. Curves 10, 12 and 14 are isotherms respectively at the constant reaction temperatures of 1225° C., 1275° C. and 1375° C. for varying hydrogen to titanium tetrachloride mol ratios below about 4.0. It can be seen that, as shown by isothems 10 and 12, a stoichiometric composition of titanium carbide is obtained even at a hydrogen to titanium tetrachloride ratio as low as about 1.2, and that, with lower hydrogen to titanium tetrachloride ratios in the reactants, a dispersion of carbon and carbide is obtained which is substantially inversely proportional to such ratio. It can be also observed that, as shown by isotherm 14 indicating the conditions of the reaction at 1375° C., utilizing the same constant ratio of methane to titanium tetrachloride of 1.4 and operating at substantially high temperature permits the formation of deposits with very high carbon range obtained for practically any $H_2/TiCl_4$ ratios, and that the formation of stoichiometric material is prevented.

Figure 4:
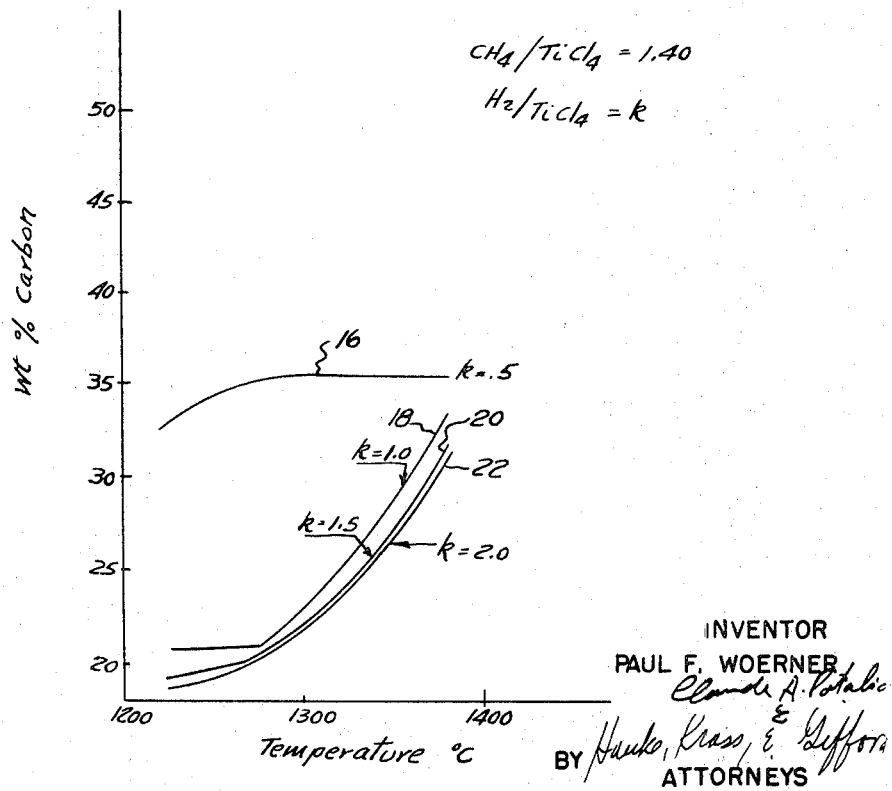
FIG. 4 is a graph showing the effect of the temperature of reaction in the method of the invention.

FIG. 4 represents a family of curves demonstrating the influence of the temperature of reaction, while operating at a constant hydrocarbon to halide mol ratio, each curve representing a different hydrogen to halide mol ratio. The curves of FIG. 4 were plotted as a result of preparing carbon-titanium carbide disperson, according to the method of the invention, using a constant methane to titanium tetrachloride ratio of 1.4, each curve representing a condition of operation and the results obtained at constant hydrogen to titanium tetrachloride ratios of respectively .5 (curve 16), 1.0 (curve 18), 1.5 (curve 20) and 2.0 (curve 22). It can be seen that the minimum reaction temperature is slightly above 1200° C. and that with increasing reaction temperatures the weight percent of carbon in the dispersion is increased.

Figure 5:
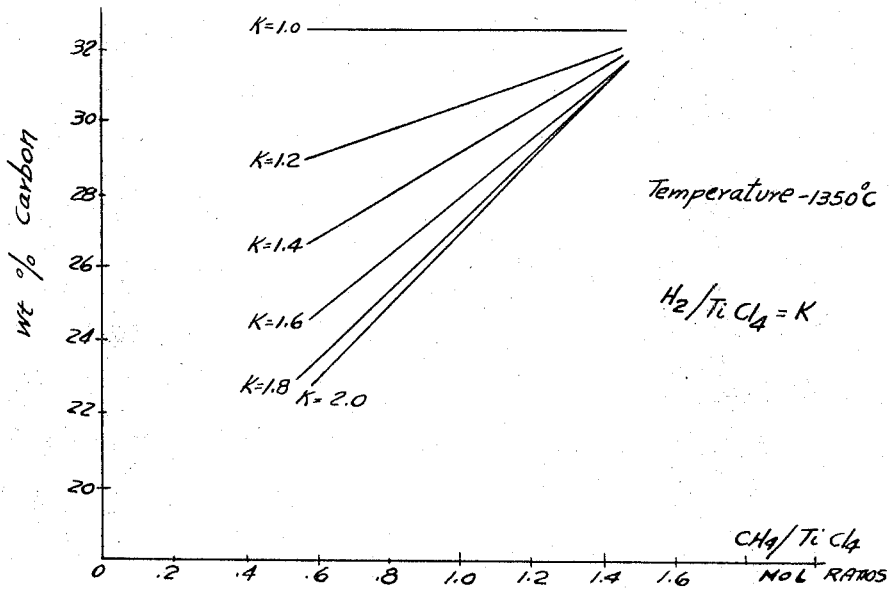
FIG. 5 is a graph representing the effect of the variation of another ratio of two of the reactants.

FIG. 5 represents graphically the influence of varying the hydrocarbon to metal halide mol ratio in the method of the invention. The curves of FIG. 5 were plotted for a constant reaction temperature of 1350° C., preparing a dispersion of carbon and titanium carbide at different constant mol ratios of hydrogen to titanium tetrachloride respectively of 1.0, 1.2, 1.4, 1.6, 1.8 and 2.0. It can be seen that for such constant ratios above about 1.0, the proportion of carbon in the dispersion, expressed in weight percent, increases with increased ratios of methane to titanium tetrachloride.

Consequently, by controlling within close limit the parameters of temperature, hydrogen to halide ratio and hydrocarbon to halide ratio, a predetermined dispersion, in a homogeneous form, may be obtained by vapor deposition according to the teachings of the present invention, such dispersion containing a well defined predetermined proportion by weight percent of carbon. Generally speaking, the proportion of carbon in the dispersion increases with increase of the reaction temperature, with lower hydrogen to halide ratio and with higher hydrocarbon to halide ratio.

Having thus described the invention by way of illustrative examples thereof, what is sought to be protected by U.S. Letters Patent is:

1. A method of preparing a composition of at least one metal carbide and carbon comprising:
reacting a mixture of predetermined ratio of a hydrocarbon and a halide of said metal in a hydrogen atmosphere at a predetermined temperature above about 1200° C.,
condensing the product of said reaction in a solid form on a substantially stable substrate, and
controlling the temperature, hydrocarbon to halide ratio and hydrogen to halide ratio so as to obtain a predetermined carbon to carbide ratio in said composition.

2. The method of claim 1 wherein said halide is a chloride.

3. The method of claim 1 wherein said hydrocarbon is methane.

4. The method of claim 1 wherein said hydrogen to halide ratio is a mol ratio comprised between about .2 and 4.0.

5. The method of claim 1 wherein the ratio of carbon to carbide in said composition is increased by an increase in temperature, at constant hydrogen to halide and hydrocarbon to halide ratios.

6. The method of claim 1 wherein the ratio of carbon to carbide in said composition is increased by a decrease of hydrogen to halide ratio, at constant temperature and hydrocarbon to halide ratio.

7. The method of claim 1 wherein the ratio of carbon to carbide in said composition is increased by an increase of the hydrocarbon to halide ratio, at constant temperature and hydrogen to halide ratio.

8. The method of claim 1 wherein the ratio of carbon to carbide in said composition is increased by an increase in temperature and an increase in the hydrocarbon to halide ratio at constant hydrogen to halide ratio.

9. The method of claim 1 wherein the ratio of carbon to carbide in said composition is increased by an increase in temperature and a decrease in the hydrogen to halide ratio at constant hydrocarbon to halide ratio.

10. The method of claim 1 wherein the ratio of carbon to carbide in said composition is increased by a decrease in the hydrogen to halide ratio and an increase in the hydrocarbon to halide ratio at constant temperature.

11. The method of claim 1 wherein the ratio of carbon to carbide in said composition is increased by an increase in temperature, an increase of the hydrocarbon to halide ratio and a decrease of the hydrogen to halide ratio.

12. A method of preparing a substantially homogeneous composition of carbon and carbide of at least one metal comprising:
heat-reacting a mixture of a hydrocarbon and a halide of said metal in a hydrogen atmosphere at a predetermined temperature and in predetermined hydrocarbon to halide and hydrogen to halide ratios, said temperature being above the temperature causing heat disassociation of said hydrocarbon and reduction of said halide by said hydrogen,
condensing the products of said heat-reaction in a solid form on a substantially stable substrate, so as to obtain said composition,
controlling the temperature, hydrocarbon to halide ratio and hydrogen to halide ratio within narrow limits for obtaining a predetermined carbon to carbide ratio in said composition,
whereby the proportion of carbon in said composition increases (a) when the temperature increases with the hydrogen to halide and the hydrocarbon to halide ratios held constant, (b) when the hydrogen to halide ratio decreases with the temperature and the hydrocarbon to halide ratio held constant; (c) when the hydrocarbon to halide ratio increases with the temperature and the hydrogen to halide ratio held constant.

13. The method of claim 12 wherein said substrate contains carbon as a principal constituent so as to react with the constituents of said composition.

14. The method of claim 12 wherein said substrate is made of a material which is non-reactive with the constituents of said composition.

15. A method of preparing on a substantially stable substrate a substantially homogeneous composition of carbon and carbide of at least one metal having a carbon concentration in the stoichiometric and hyperstoichiometric composition region of said carbide, said method comprising:
heating a gaseous mixture of a hydrocarbon and a halide of said metal in a hydrogen atmosphere at a temperature sufficient for causing heat disassociation of said hydrocarbon and reduction of said halide by said hydrogen, and
condensing a solid composition of said carbon and carbide containing carbon in weight percent at least equal to the carbon in weight percent corresponding to the stoichiometric proportion in said carbide, said carbide being formed according to the formula

wherein
M is a metal,
X is a halogen,
C is carbon,
H is hydrogen,
$H_2$ is hydrogen gas,
and $a$ and $b$ are integers for conditions where $x$ is greater than 1.

16. The method of claim 15 wherein said substantially stable substrate contains carbon as a principal constituent so as to react with the constituents of said composition.

17. The method of claim 15 wherein said substantially stable substrate is made of a material which is non-reactive with the constituents of said composition.

18. The method of claim 15 wherein the ratio of carbon to carbide in said composition is increased by an increase in temperature, at constant hydrogen to halide and hydrocarbon to halide ratios.

19. The method of claim 15 wherein the ratio of carbon to carbide in said composition is increased by a decrease of the hydrogen to halide mol ratio, at constant temperature and hydrocarbon to halide mol ratio.

20. The method of claim 15 wherein the ratio of carbon to carbide in said composition is increased by an increase of the hydrocarbon to halide ratio, at constant temperature and hydrogen to halide ratio.

21. The method of claim 15 wherein the ratio of carbon to carbide in said composition is increased by an increase in temperature and an increase in the hydrocarbon to halide ratio at constant hydrogen to halide ratio.

22. The method of claim 15 wherein the ratio of carbon to carbide in said composition is increased by an increase in temperature and a decrease in the hydrogen to halide ratio at constant hydrocarbon to halide ratio.

23. The method of claim 15 wherein the ratio of carbon to carbide in said composition is increased by a decrease in the hydrogen to halide ratio and an increase in the hydrocarbon to halide ratio at constant temperature.

24. The method of claim 15 wherein said halide is a chloride.

25. The method of claim 15 wherein said hydrocarbon is methane.

26. The method of claim 15 wherein said temperature is above about 1200° C.

27. The method of claim 15 wherein said hydrocarbon to halide ratio is a mol ratio comprised between about .2 and 4.0.

28. The method of claim 15 wherein said hydrogen to halide ratio is a mol ratio comprised between .2 and 1.2.

References Cited

UNITED STATES PATENTS

| 2,962,388 | 11/1960 | Ruppert et al. | 117—106 X |
| 3,346,338 | 10/1967 | Latham | 264—81 X |
| 3,367,826 | 2/1968 | Heestand et al. | 264—81 X |

OTHER REFERENCES

Campbell, I. E., Powell, C. F., Nowicki, D. H. and Gonser, B. W.: The Vapor-Phase Deposition of Refractory Materials, in Journ. Electrochem. Soc., 96, November 1949, pp. 318–333.

Schwarzkopf, P. and Kieffer, R.: Refractory Hard Metals, New York, MacMillan, 1953, pp. 57–58.

HELEN M. McCARTHY, Primary Examiner

W. R. SATTERFIELD, Assistant Examiner

U.S. Cl. X.R.

23—208; 106—43; 117—106; 264—81

UNITED STATES PATENT OFFICE
CERTIFICATE OF CORRECTION

Patent No. 3,529,988　　　　　　Dated September 22, 1970

Inventor(s) PAUL F. WOERNER

It is certified that error appears in the above-identified patent and that said Letters Patent are hereby corrected as shown below:

IN THE CLAIMS

Column 6, line 30, cancel and insert thereinstead:

$$-- MY_a + xCH_b \overset{H_2}{\rightleftharpoons} MC_x + aHY + \frac{xb-a}{2} H_2$$

line 35, change "X" to -- Y --

Signed and sealed this 18th day of April 1972.

(SEAL)
Attest:

EDWARD M. FLETCHER, JR.
Attesting Officer

ROBERT GOTTSCHALK
Commissioner of Patents